United States Patent
Lee et al.

(10) Patent No.: US 9,007,296 B2
(45) Date of Patent: Apr. 14, 2015

(54) THREE-DIMENSIONAL IMAGE DISPLAY APPARATUS AND METHOD

(75) Inventors: Hong-seok Lee, Seongnam-si (KR);
Hoon Song, Yongin-si (KR);
Yong-kweun Mun, Yongin-si (KR);
Yoon-sun Choi, Yongin-si (KR);
Hyung-sok Yeo, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 610 days.

(21) Appl. No.: 12/938,454

(22) Filed: Nov. 3, 2010

(65) Prior Publication Data

US 2011/0187635 A1    Aug. 4, 2011

(30) Foreign Application Priority Data

Feb. 4, 2010    (KR) .................. 10-2010-0010501

(51) Int. Cl.
*G09G 3/32*    (2006.01)
*G09G 3/36*    (2006.01)

(52) U.S. Cl.
CPC ........................................ *G09G 3/36* (2013.01)

(58) Field of Classification Search
USPC .............. 345/42–60; 349/15; 438/42–65; 359/462–477
See application file for complete search history.

(56) References Cited

U.S. PATENT DOCUMENTS

| | | | | |
|---|---|---|---|---|
| 7,298,552 B2 * | 11/2007 | Redert | | 359/463 |
| 8,248,694 B2 * | 8/2012 | Sugiyama | | 359/465 |
| 8,373,684 B2 * | 2/2013 | Kim et al. | | 345/204 |
| 2004/0017334 A1 * | 1/2004 | Chan | | 345/6 |
| 2009/0045759 A1 * | 2/2009 | Kang et al. | | 315/307 |
| 2009/0091667 A1 * | 4/2009 | Schultz et al. | | 349/15 |
| 2010/0177025 A1 * | 7/2010 | Nagata et al. | | 345/76 |

FOREIGN PATENT DOCUMENTS

| | | |
|---|---|---|
| JP | 07-020453 | 1/1995 |
| JP | 2005-078824 | 3/2005 |
| JP | 2005-338245 | 12/2005 |
| KR | 1998-063900 | 11/1998 |

* cited by examiner

*Primary Examiner* — Robin Mishler
(74) *Attorney, Agent, or Firm* — NSIP Law (57) ABSTRACT

A three-dimensional (3D) image display apparatus that includes a surface-light source device for emitting light in a direction which may be sequentially adjusted, is provided. The 3D image display apparatus includes a display panel for generating images by modulating the light emitted from the surface-light source device according to image information. The 3D image display apparatus also includes a controller for controlling the directivity adjustment of the light from the surface-light source device in a time-sequential manner and the image formation for each visual field of the display panel to be synchronized with each other.

17 Claims, 7 Drawing Sheets

SEQUENTIAL FLICKERING

FIG. 2B

SEQUENTIAL FLICKERING

THREE-DIMENSIONAL IMAGE DISPLAY APPARATUS AND METHOD

CROSS-REFERENCE TO RELATED APPLICATION(S)

This application claims the benefit of Korean Patent Application No. 10-2010-0010501, filed on Feb. 4, 2010, in the Korean Intellectual Property Office, the entire disclosure of which is incorporated herein by reference for all purposes.

BACKGROUND

1. Field

The following description relates to methods and apparatuses for displaying a three-dimensional image.

2. Description of the Related Art

Three-dimensional (3D) image display apparatuses are being studied for use in various fields such as medical images, games, advertisements, education, military applications, and the like. In addition, research on holography and stereoscopy is also being conducted to display three-dimensional images.

Holographic methods are ideal for displaying 3D images, but one of the drawbacks associated with holography is that a coherent light source is required and it is difficult to record/reproduce an object that is located far away.

In a stereoscopic method, two two-dimensional (2D) images that have a binocular parallax are viewed by left and right eyes of a viewer, respectively, thereby making the image stereoscopic. In the stereoscopic method, two image planes are used, and thus, a 3D image is generated. An example of a stereoscopic method is a glasses-type method in which a viewer uses an auxiliary means, such as eyeglasses, in order for both eyes to see the divided images. Another example of a stereoscopic method is an autostereoscopic method that forms a visual field by dividing the images in a display itself. The autostereoscopic method is generally favorable because the glasses-type method requires additional glasses, and a parallax barrier type and a lenticular lens type are used.

However, because the stereoscopic type three-dimensional image display apparatus only provides images with two viewpoints, a viewer may only see the 3D images within a very restricted region. For example, if the viewer moves his/her head, left and right images are inversed and it may be difficult to see the three-dimensional image.

SUMMARY

In one general aspect, there is provided a three-dimensional (3D) image display apparatus comprising a surface-light source device for emitting light in a direction that is sequentially adjusted towards one or more visual fields, a display panel for generating images for each visual field by modulating the light emitted from the surface-light source device according to image information, and a controller for controlling the direction adjustment of the light emitted from the surface-light source device and the image generation for each visual field of the display panel to be synchronized with each other.

The surface-light source device may comprise a light source unit may comprise a plurality of point light sources, wherein the direction of the light is adjusted by flickering the plurality of point light sources, a light guide plate comprising a side surface to which the light emitted from the light source unit is incident, and an upper surface through which the incident light is emitted, and an inversed prism sheet for collimating the light emitted from the light guide plate.

The light source unit may comprise a plurality of light source groups each of which comprises one or more adjacent point light sources, the point light sources in the light source groups may be simultaneously flickered, and the plurality of light source groups may be sequentially flickered one by one.

The 3D image display apparatus of claim 2, wherein the light source unit comprises a plurality of light source groups each of which comprises a plurality of adjacent point light sources, and the plurality of light source groups may be simultaneously flickered such that one point light source in each respective group is flickered at the same time.

The light guide plate may be a wedge-type light guide plate and may have a thickness that decreases in a direction away from the light source unit.

The 3D image display apparatus may further comprise a sensor for recognizing a location of a viewer, wherein the controller controls the time-sequential driving of the display panel and the surface-light source device so that the image is displayed only on a visual field corresponding to the location of the viewer.

The 3D image display apparatus may further comprise a passive optical device for converging the light emitted from the surface-light source device to a certain visual field.

The passive optical device may be located between the surface-light source device and the display panel.

The display panel may be located between the surface-light source device and the passive optical device.

In another aspect, there is provided a three-dimensional (3D) image display apparatus comprising a surface-light source device for emitting light that is collimated in a direction, a display panel for generating images by modulating the light emitted from the surface-light source device according to image information, an active optical device array unit for adjusting the direction of the light such that the image generated by the display panel is displayed toward one or more visual fields, and a controller for controlling the image formation for each visual field of the display panel and the direction adjustment of the light by the active optical device array unit such that they are synchronized with each other.

The 3D image display apparatus may further comprise a sensor for recognizing a location of a viewer, wherein the controller controls the time-sequential driving of the display panel and the active optical device array unit so that the image is displayed only on a visual field corresponding to the location of the viewer.

The surface-light source device may comprise a light source unit, a light guide plate comprising a side surface to which the light emitted from the light source unit is incident, and an upper surface through which the incident light is emitted, and an inversed prism sheet for collimating the light emitted from the light guide plate.

The light source unit may comprise a plurality of point light sources or a line light source.

The light source unit may comprise a plurality of point light sources and the direction of the emitted light may be adjusted by flickering the plurality of point light sources.

The light source unit may comprise a plurality of light source groups each of which comprises one or more adjacent point light sources, the point light sources in the light source group may be simultaneously flickered, and the plurality of light source groups may be sequentially flickered one by one.

The light source unit comprises a plurality of light source groups each of which comprises a plurality of adjacent point light sources, and the plurality of light source groups may be simultaneously flickered such that one light source in each respective group is flickered at the same time.

The 3D image display apparatus may further comprise a sensor for recognizing a location of a viewer, wherein the controller selects one or more of the plurality of point light sources and controls the time-sequential driving of the display panel, the active optical device array unit, and the selected point light sources to display the image on a visual field corresponding to the location of the viewer.

The active optical device array unit may be one of a variable lens array, a variable prism array, a computer generating hologram (CGH), and a variable grating array.

In another aspect, there is provided a three-dimensional (3D) image display method comprising irradiating light emitted as a surface light onto a display panel while adjusting a direction of the emitted light in a time-sequential manner towards a plurality of visual fields, and modulating the light according to image information of the visual field that corresponds to the direction of the emitted light, in synchronization with the direction adjustment.

In another aspect, there is provided a three-dimensional (3D) image display method comprising irradiating surface light that is collimated in a direction toward a display panel, modulating the light in a time-sequential manner according to image information of a plurality of visual fields to generate images, and adjusting a direction of the image toward the corresponding visual field in synchronization with the image formation of the plurality of visual fields.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

The examples herein describe methods and apparatuses for adjusting the sequential turning on/off of light sources and/or adjusting a direction of a formed image in order to display three-dimensional images. That is, the direction of the image may be adjusted to face a plurality of visual fields in a time-sequential manner when a surface light is emitted to a display panel, and the display panel forms images for each of the visual fields in synchronization with the direction of the image. Light may be modulated in a time-sequential manner based on image information of a plurality of visual fields, and the direction of the formed image may be adjusted to face a corresponding visual field in synchronization with the time-sequential modulation of the light.

Examples of the three-dimensional (3D) image display device and method are described herein. The 3D image display may display moving images as well as still images. The 3D image display may also display two-dimensional (2D) images. For example, the 3D image display can transition between a first mode in which the display displays images in 3D, and a second mode in which the 3D image display displays images in 2D.

Figure 1:
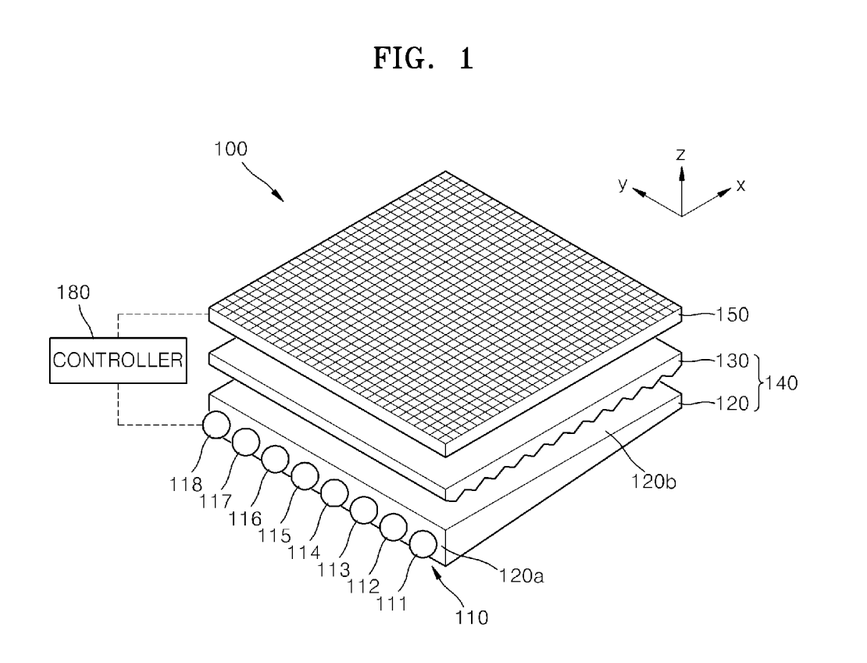
FIG. 1 is a diagram illustrating an example of a three-dimensional (3D) image display apparatus.

FIG. 1 illustrates an example of a 3D image display apparatus. Referring to FIG. 1, 3D image display apparatus 100 includes a surface-light source device 140 for emitting light, the direction of which may be adjusted in a time-sequential manner, a display panel 150 for modulating the light emitted from the surface-light source device 140 according to image information in order to generate images, and a controller 180 for controlling the adjustment of the direction of the light emitted from the surface-light source device 140 in a time-sequential manner in order to be synchronized with image generation for each visual field in the display panel 150.

Various structures that emit surface-light that is collimated may be included in the surface-light source device 140. For example, as shown in FIG. 1, the surface-light source device 140 may include a light source unit 110 that includes a plurality of point light sources 111-118, a light guide plate 120 that includes a side surface 120a to which the light emitted from the light source unit 110 is incident, an upper surface 120b through which the light that is incident to the side surface 120a is emitted, and an inverted prism sheet 130 for collimating the light emitted from the light guide plate 120. For example, the light guide plate 120 may be wedge-shaped such that a thickness of the light guide plate 120 decreases in a direction away from the light source unit 110.

The surface-light source device 140 may include various structures that may emit light that may be collimated in various directions. Because the direction of the emitted light may be adjusted according to selective turning on/off of the point light sources 111-118, the collimating performance or brightness uniformity may be at a level that is equal to or higher in emitting the light from the point light sources 111-118 as the surface light shape. To this end, an additional component may be added or the shape of the light guide plate 120 may be changed such that the light emitted from the light source unit 110 may be mixed before being emitted to the outside.

The point light sources 111-118 of the light source unit 110 may be controlled to be sequentially turned on/turned off, and the direction of the light emitted from the surface-light source device 140 may be adjusted according to a position of a point light source that is turned on. The point light sources 111-118 may be sequentially turned on/off in a group that includes a plurality of point light sources. For example, the point light sources 111-118 may be sequentially flickered one by one, or groups of the point light sources including multiple point light sources, for example, two or three point light sources may be sequentially flickered at the same time. The driving of the point light sources 111-118 may be determined in consideration of a driving speed of the display panel 150.

The above process is further described with reference to FIGS. 2A through 2D, which illustrate examples of generating 3D images by the 3D image display apparatus 100 of FIG. 1.

Figure 2A:
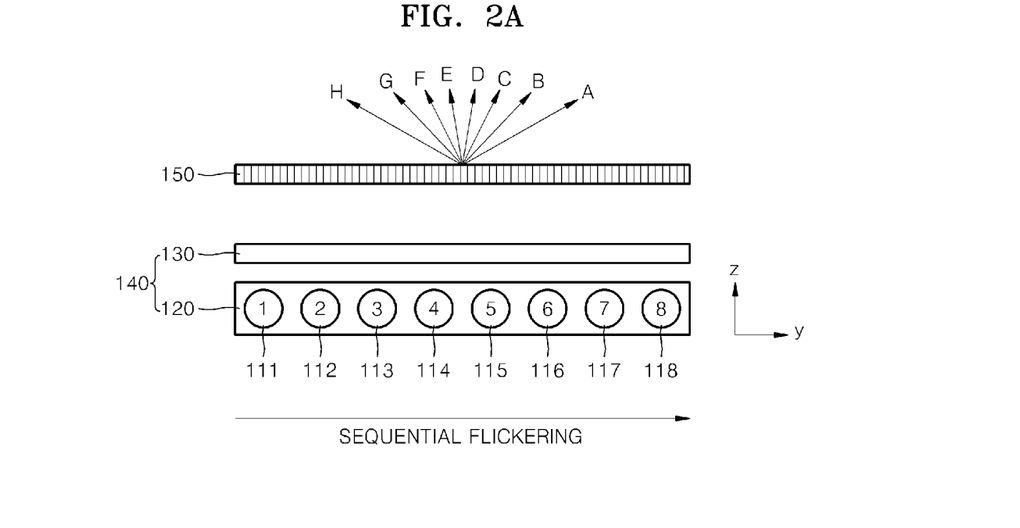
FIGS. 2A through 2D are diagrams illustrating examples of generating a 3D image in the 3D image display apparatus of FIG. 1.

Referring to FIG. 2A, the point light sources 111-118 are sequentially flickered one by one. An order of flickering the point light sources 111-118 is denoted by the numbers 1-8. When the point light source 111 is turned on only, the light emitted from the surface-light source device 140 is incident on the display panel 150 in a direction toward a visual field A. The display panel 150 modulates the incident light according to image information corresponding to the visual field A. When the point light source 111 is turned off and the point light source 112 is turned on, the light emitted from the surface-light source device 140 is incident on the display panel 150 in a direction toward a visual field B. The display panel 150 modulates the incident light according to the image information corresponding to the visual field B. Similarly, when point light sources 113-118 are turned on only, the light emitted from the surface-light source device 140 is incident on the display panel 150 in a direction towards visual fields C-H, respectively.

As described above, when each of the point light sources 111-118 is flickered, the display panel 150 modulates the incident light according to image information of the corresponding visual field A, B, . . . , or H. The scanning speed of the point light sources 111-118 and driving speed of the display panel 150 may be synchronized. The scanning speed of the point light sources 111-118 and the driving speed of the display panel 150 may be set such that the combination of the images displayed on the display panel 150 during the scanning period of the point light sources 111-118 is recognized as an image of one frame. A viewer recognizes a combination of the images, which are different from each other, according to the directions of incident light, and accordingly, may see a 3D image.

Figure 2B:
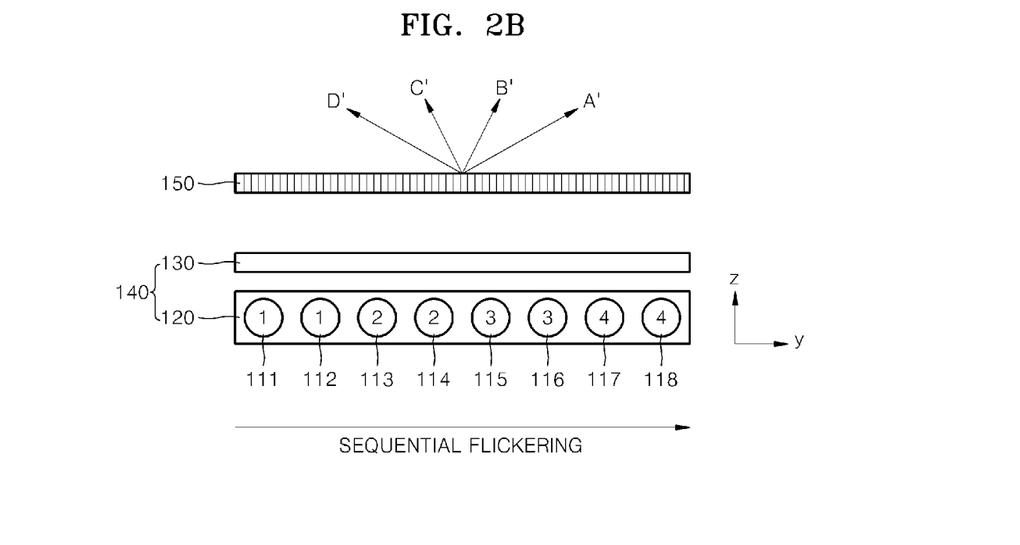

Referring to FIG. 2B, the light source unit 110 includes a plurality of light source groups, each of which includes one or more point light sources that are adjacent to each other. As shown in FIG. 2B, two adjacent point light sources form a group, and the groups of point light sources are sequentially flickered. That is, a plurality of light sources are grouped and the point light sources in one light source group are simultaneously flickered. The above-described driving method of point light sources may be used when, for example, the driving speed of the display panel 150 is slower than that of the display panel 150 of FIG. 2A. The flickering order of the light source groups is denoted by the numbers 1-4.

For example, when the point light sources 111 and 112 constitute a first group of light sources, and point light sources 111 and 112 are on simultaneously, the light emitted from the surface-light source device 140 is incident on the display panel 150 in a direction towards a visual field A'. The display panel 150 modulates the incident light according to image information corresponding to the visual field A'. When the point light sources 113 and 114 are on simultaneously, the display panel 150 modulates the incident light according to image information in a direction towards a visual field B'. In addition, the display panel 150 modulates the incident light according to image information in a direction towards a visual field C' when the point light sources 115 and 116 are on simultaneously, and modulates the incident light according to image information in a direction towards a visual field D' when the point light sources 117 and 118 are turned on.

Figure 2C:
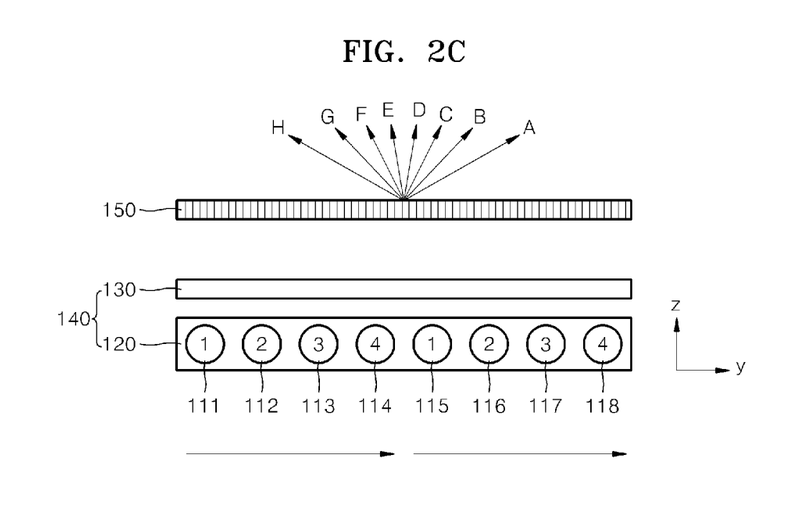

Referring to FIG. 2C, the light source unit 110 includes a plurality of light source groups, each of which includes a plurality of point light sources that are adjacent to each other.

As shown in FIG. 2C, point light sources respectively included in two light source groups are sequentially flickered, one of each group at a time. The flickering order is denoted by the numbers 1-4. The above-described driving method of point light sources may be used when the driving speed of the display panel 150 is slower than that of the display panel 150 of FIG. 2A. For example, when the driving speed of the display panel 150 is not fast enough to display all images which are different according to allowable incident directions of the incident light, a visual angle range may be divided into a plurality of sections, and the same image may be displayed in a direction towards each of the sections for a plurality of times.

In this example, point light sources 111-114 constitute a first group and point light sources 115-118 constitute a second group. Accordingly, point light sources 111 and 115 may be on together simultaneously, next the point light sources 112 and 116 may be on together simultaneously, and this continues with point light sources 113 and 117, and 114 and 118. Accordingly, the light emitted from the surface-light source device 140 may be incident on the display panel 150 respectively toward the visual fields A and E, the visual fields B and F, the visual fields C and G, and the visual fields D and H, sequentially. The display panel 150 modulates the image in synchronization with the scanning of the point light sources 111-118. Accordingly, the same image may be displayed simultaneously on the visual fields A and E, the same image may be simultaneously displayed on the visual fields B and F, the same image may be simultaneously displayed on the visual fields C and G, and the same image may be simultaneously displayed on the visual fields D and H.

Figure 2D:
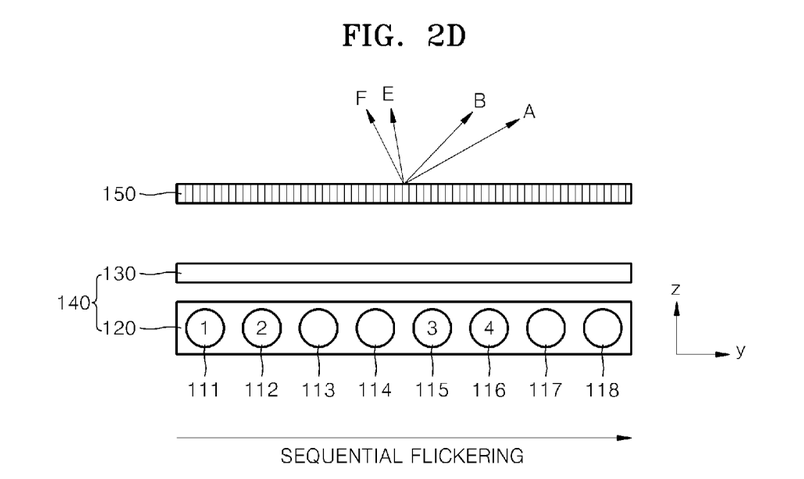

Referring to FIG. 2D, in this example, some point light sources 111, 112, 115, and 116 of the light source unit 110 are sequentially flickered. In the example shown in FIG. 2D, the image may be displayed on the required positions based on the location of one or more viewers. For example, a sensor (not shown) may be installed in order to sense the location of the viewer, and the controller 180 may control the display panel 150 and the time-sequential driving of the surface-light source device 140 such that the image may be displayed only on the visual field corresponding to the location of the viewer. For example, the sensor may be an infrared-ray sensor. As shown in FIG. 2D, when the viewer is located on the visual fields A, B, E, and F, some of the point light sources 111-118 are selectively flickered such that the light emitted from the surface-light source device 140 may proceed in a direction towards the corresponding visual fields. That is, in this example only the point light sources 111, 112, 114, and 116 are flickered, and the light sources 113, 114, 117, and 118 are not flickered. The display panel 150 modulates the incident light according to image information of the corresponding visual field, in synchronization with the sequential flickering of the point light sources 111, 112, 115, and 116. Because the image is only displayed on the location where the viewer is located, power consumption of the 3D image display apparatus 100 is reduced.

The number of point light sources provided in the above description is merely for purposes of example. It should be understood that more or less point light sources may be used. In addition, one or two point light sources are flickered as a group in the above description, however, it should be understood that three or more point light sources may be flickered simultaneously.

Figure 3:
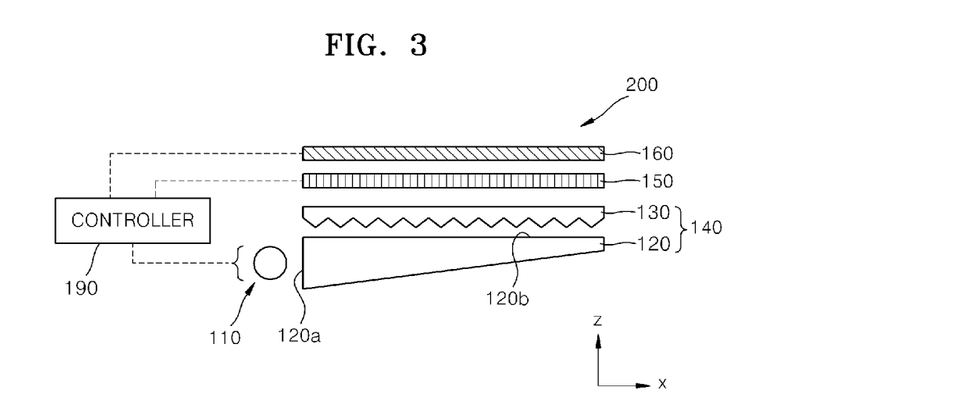
FIG. 3 is a diagram illustrating another example of a 3D image display apparatus.

FIG. 3 is a diagram illustrating another example of a 3D image display apparatus. Referring to FIG. 3, 3D image display apparatus 200 includes the surface-light source device 140, the display panel 150 for modulating the light emitted from the surface-light source device 140 according to image information in order to generate an image, an active optical device array unit 160 for adjusting the direction of the image generated by the display panel 150 to face a predetermined visual field, and a controller 190 for controlling operations of the surface-light source device 140, the display panel 150, and the active optical device array unit 160.

Various structures that may emit surface-light that is collimated in a direction may be included in the surface-light source device 140. For example, the surface-light source device 140 may include the light source unit 110, a light guide plate 120 including a side surface 120a to which the light emitted from the light source unit 110 is incident and an upper surface 120b through which the light that is incident to the side surface 120a is emitted, and an inverted prism sheet 130 for collimating the light emitted from the light guide plate 120. The light source unit 110 may include a plurality of point light sources as described above with reference to the 3D image display apparatus 100 of FIG. 1.

The display panel 150 may be formed of, for example, a high-speed liquid crystal display (LCD) panel, and may generate images according to image information corresponding to visual fields. The display panel may be formed of various other materials, for example, a plurality of light emitting diodes (LEDs), a plurality of organic LEDs (OLEDs), and the like.

The active optical device array unit 160 may variably adjust the direction of the incident light. For example, the active optical device array unit 160 may include, for example, a variable lens array, a variable prism array, a computer generating hologram (CGH), and a variable grating array. The active optical device array unit 160 may be controlled in synchronization with the visual field information of the image generated by the display panel 150, and the generated image may be displayed on the corresponding visual fields.

The controller 190 may control the image formation in each of the visual fields generated by the display panel 150 and the direction adjustment by the active optical device array unit 160 such that they may be synchronized with each other. Alternatively, the controller 190 may control the sequential flickering of the point light sources in the surface-light source device 140 and the direction adjustment of the active optical device array unit 160 together, in synchronization with the image generation for each of the visual fields in the display panel 150.

FIGS. 4A through 4E illustrate examples of generating a 3D image in the 3D image display apparatus of FIG. 3.

Figure 4A:
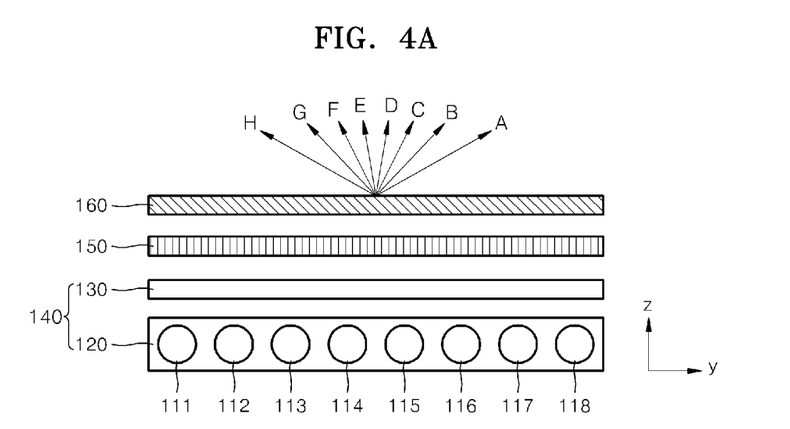
FIGS. 4A through 4E are diagrams illustrating example of generating a 3D image in the 3D image display apparatus of FIG. 3.

Referring to FIG. 4A, the entire light source unit 110 located on side surface 120a of the surface-light source device 140 is turned on. That is, the point light sources 111-118 are turned on. For example, the light source unit 110 may be a line light source. In addition, the surface-light source device 140 may have a direct type structure, as well as the edge type structure shown in FIG. 4A.

The active optical device array unit 160 may adjust the direction of incident light in synchronization with the image formation in each of the visual fields by the display panel 150. For example, when the display panel 150 modulates the incident light according to the image information of the visual field A, the active optical device array unit 160 may adjust the direction of an incident image toward the visual field A. For example, if the active optical device array unit 160 is a variable lens array using a liquid lens, the shape of a lens surface may be adjusted. As another example, if the active optical device array unit 160 includes a prism array, an inclination angle of a prism surface may be adjusted. When the display panel 150 sequentially modulates the incident light according to the image information corresponding to the visual fields B-H, the active optical device array unit 160 may be adjusted sequentially such that the incident images are displayed towards the visual fields B-H, respectively.

As described above, on the flickering of each of the point light sources 111-118, the display panel 150 may modulate the incident light according to the image information of the corresponding visual field A, B, . . . , or H. The scanning speed of the point light sources 111-118 and the driving speed of the active optical device array unit 160 and the display panel 150 may be in synchronization with the scanning speed of the point light sources 111-118 and may be set such that the combination of the images displayed on the display panel 150 during the scanning period of the point light sources 111-118 may be recognized as a frame image. Accordingly, the viewer may see a combination of images that are different from each other based on the incident direction of light, and accordingly, may recognize the combined images as a 3D image. The number of visual fields shown in FIG. 4A is merely for purposes of example, and may be determined based on the directivity range that is adjustable by the active optical device array unit 160 and the driving speed of the display panel 150.

Figure 4B:
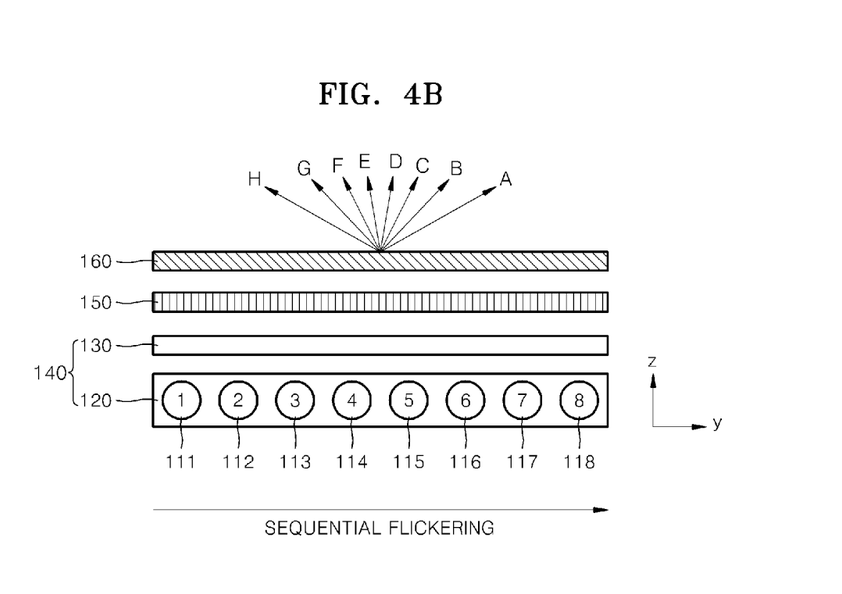

Referring to FIG. 4B, the point light sources 111-118 in the light source unit 110 are sequentially flickered, and the display panel 150 generates the image for each of the visual fields in synchronization with the sequential flickering of the point light sources 111-118. In addition, in synchronization with the image formation of the display panel 150, the active optical device array unit 160 may be adjusted such that the image for each of the visual fields generated by the display panel 150 may be displayed towards the corresponding visual field. In the above example, the active optical device array unit 160 may support the directivity that is adjusted according to the sequential flickering of the plurality of light sources 111-118. For example, the surface-light source device 140 and the active optical device array unit 160 may generate the images displayed on the corresponding visual fields such that the images are complementarily to each other.

Figure 4C:
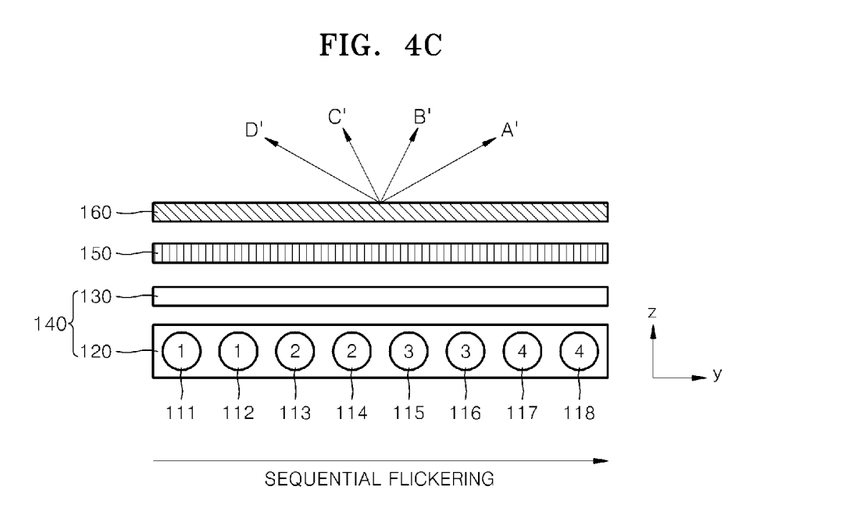

Referring to FIG. 4C, the light source unit 110 includes groups of point light sources, each of which includes two point light sources, and the groups are sequentially flickered. For example, this driving method may be used when the driving speed of the display panel 150 is slower than that of the display panel 150 of FIG. 4A. The flickering order is represented by the numbers 1-4. The active optical device array unit 160 may adjust the direction of the light emitted from the surface-light source device 140 in a direction towards visual fields A', B', C', and D' in synchronization with the sequential driving of the surface-light source device 140.

The display shown in FIG. 4C may be modified, for example, the direction of the images for the visual fields generated by the display panel 150 may be adjusted to be displayed towards the visual fields A', B', C', and D' by only the active optical device array unit 160.

Figure 4D:
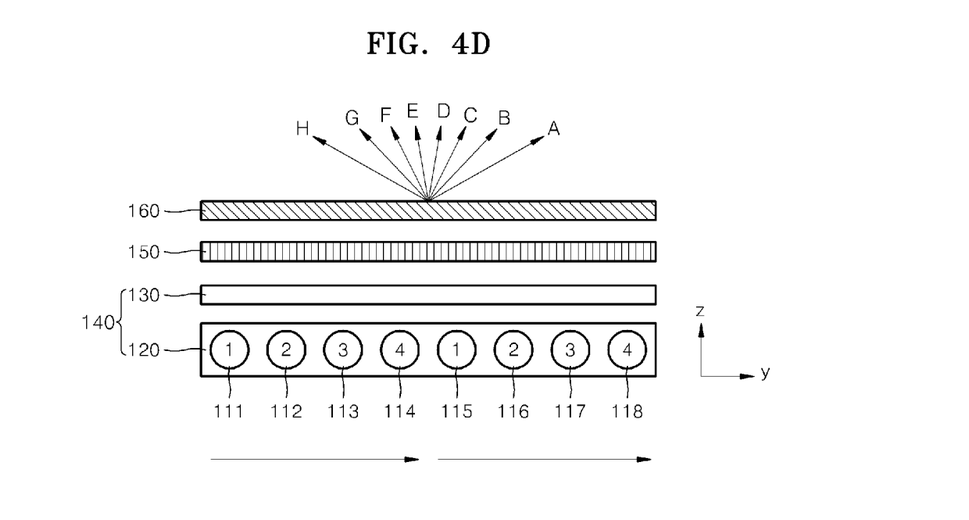

Referring to FIG. 4D, the light source unit 110 includes two light source groups, each of which includes a plurality of adjacent point light sources, and the point light sources respectively included in two light source groups are sequentially flickered, one group at a time. The flickering order is represented by the numbers 1-4. For example, this driving method of the point light sources may be used when the driving speed of the display panel 150 is slower than that of the display panel 150 of FIG. 4A. When the driving speed of the display panel 150 is not fast enough to display each of the images based on the allowable incident directions of the incident light, a visual angle range may be divided into a plurality of sections, and the same image may be displayed in a direction towards each of the sections for a plurality of times.

For example, the point light sources 111 and 115 may be on together simultaneously, and then, the point light sources 112 and 116, 113 and 117, and 114 and 118, may be on together sequentially, respectively. In this example, the active optical device array unit 160 may be adjusted such that the light emitted from the surface-light source device 140 is incident on the display panel 150 in a direction towards the visual fields A and E, the visual fields B and F, the visual fields C and G, and the visual fields D and H, respectively. The visual fields may be adjusted sequentially, in synchronization with the sequential driving of the surface-light source device 140. The display panel 150 may modulate the image in synchronization with the scanning of the point light sources 111-118 and the driving of the active optical device array unit 160. Accordingly, the same image may be displayed on the visual fields A and E, visual fields B and F, visual fields C and G, and visual fields D and H.

Figure 4E:
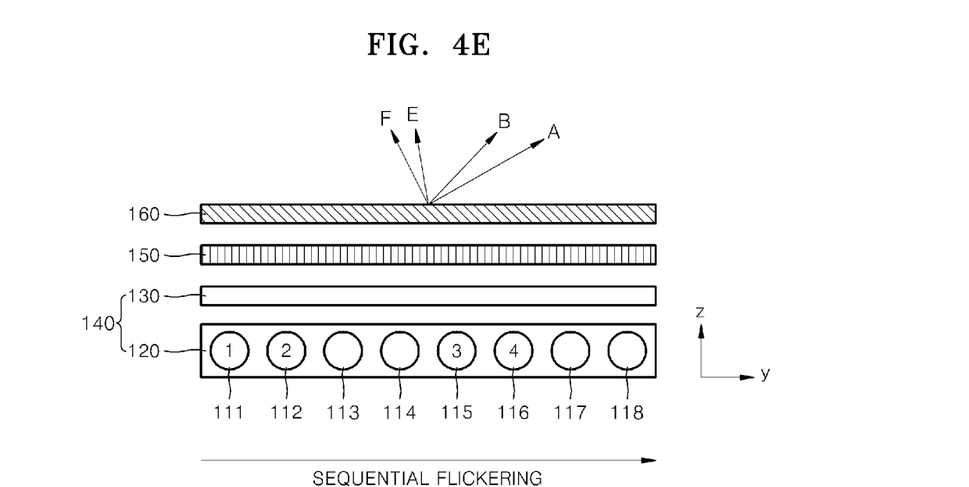

Referring to FIG. 4E, some of the point light sources 111, 112, 115, and 116 of the light source unit 110 are sequentially flickered. In the example shown in FIG. 4E, the image may be displayed based on the location of one or more viewers. For example, a sensor (not shown) may be installed in order to sense the location of the viewer, and the controller may control the time-sequential driving of the display panel 150, the surface-light source device 140, and the active optical device array unit 160 such that the image may be displayed only on the visual field corresponding to the location of the viewer.

As shown in FIG. 4E, when the viewer is located on the visual fields A, B, E, and F, some of the point light sources 111-118 are selectively flickered such that the light emitted from the surface-light source device 140 may proceed in a direction towards the corresponding visual fields. For example, only the point light sources 111, 112, 114, and 116 are flickered, and the light sources 113, 114, 117, and 118 are not flickered. The display panel 150 may modulate the incident light according to image information of the corresponding visual field, in synchronization with the sequential flickering of the point light sources 111, 112, 115, and 116. The active optical device array unit 160 may supportively adjust the direction of the light emitted from the surface-light source device 140 such that the light is emitted towards the visual fields A, B, E, and F, in synchronization with the sequential driving of the surface-light source device 140.

The example shown in FIG. 4E may be modified, for example, the point light sources 111-118 that are simultaneously on, and the images for the visual fields formed by the display panel 150 may be adjusted to be displayed in a direction towards the A, B, E, and F visual fields by the active optical device array unit 160 only.

Figure 5:
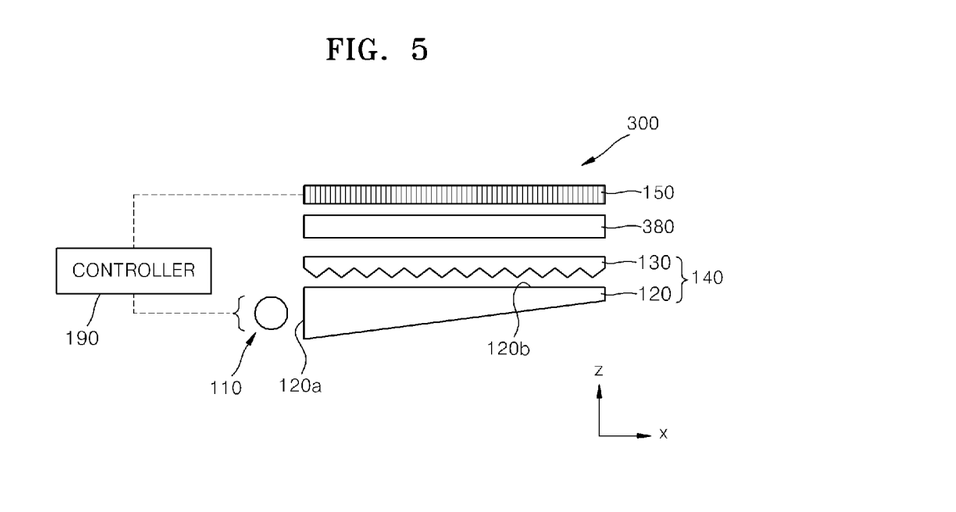
FIG. 5 is a diagram illustrating another example of a 3D image display apparatus.

FIG. 5 is a diagram illustrating another example of a 3D image display apparatus. Referring to FIG. 5, 3D image display apparatus 300 includes the surface-light source device 140, a passive optical device 380 for converging the light emitted from the surface-light source device 140 on a predetermined visual field, the display panel 150 for modulating the light emitted from the surface-light source device 140 according to image information to form an image, and a controller 190 for controlling operations of the surface-light source device 140 and the display panel 150. While not shown in FIG. 5, the 3D image display apparatus 300 may also include the active optical device array unit 160 described above with reference to FIG. 3, which may variably adjust the direction of the incident light.

Various structures that may emit surface-light that is collimated in a direction while adjusting the direction of the light may be included in the surface-light source device 140. For example, as previously described, the surface-light source device 140 may include the light source unit 110, the light guide plate 120, and the inversed prism sheet 130, and the direction of the light emitted from the surface-light source device 140 may be adjusted by the sequential flickering of the point light sources included in the light source unit 110.

The passive optical device 380 may converge the surface light emitted from the surface-light source device 140 and collimated in a direction at a predetermined visual field and may be, for example, a lens element. In this example, the passive optical device 380 is located between the surface-light source device 140 and the display panel 150, however, the display apparatus is not limited thereto. For example, the locations of the display panel 150 and the passive optical device 380 may be exchanged with each other.

The display panel 150 may be formed of, for example, a high-speed LCD panel, and may generate images according to image information corresponding to visual fields. The visual field on which the light is converged by the passive optical device 380, may vary based on the direction of the light emitted from the surface-light source device 140, and the display panel 150 may modulate the light to display the image corresponding to the visual field.

The controller 190 may control the sequential flickering of the point light sources in the surface-light source device 140 and the image formation for each of the visual fields by the display panel 150 to be synchronized with each other.

Figure 6:
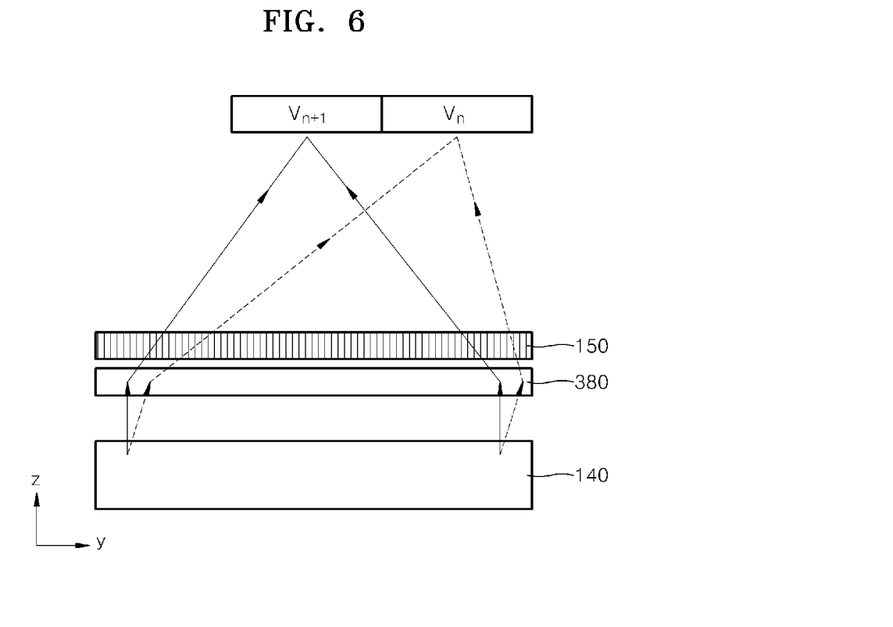
FIG. 6 is diagram illustrating an example of generating a 3D image in the 3D image display apparatus of FIG. 5.

FIG. 6 illustrates an example of generating a 3D image in the 3D image display apparatus 300 of FIG. 5. Referring to FIG. 6, the convergence position by the passive optical device 380 varies based on the direction of the light emitted from the surface-light source device 140. For example, an optical path through which the light emitted from the surface-light source device 140 is converged on a viewpoint $V_n$, and an optical path through which the emitted light is converged on a viewpoint $V_{n+1}$, are represented respectively as a dashed line and a solid line. Due to the convergence of the light emitted from the surface-light source device 140 onto a certain visual field by the passive optical device 380, the emitted light that is collimated in a direction by the surface-light source device 140 has different directions at each of pixels of the display panel 150.

The display panel 150 modulates the incident light according to the direction and the image information corresponding to the corresponding viewpoint. For example, the optical paths of the light converged on the viewpoints $V_n, V_{n+1}, \ldots$ may be sequentially generated according to the directions of the light emitted by the sequential driving of the surface-light source device 140, and the display panel 150 generates the images corresponding to the optical paths. Therefore, the multi-view 3D image may be generated within the directivity range of the surface-light source device 140, and the viewer may see the 3D image without a limitation in the viewing position.

The 3D image display apparatus 300 is different from the 3D image display apparatus 100 of FIG. 1 in that the passive optical device 380 is further included in the apparatus. Accordingly, the optical path of the light converged onto a certain visual field may be generated, and the display panel may modulate the light to form the image corresponding to the optical path. Other modifications of the previous examples may be applied to the example shown in FIG. 6, for example, the directivity range of the light emitted from the surface-light source device 140 may be adjusted in consideration of the driving speed of the display panel 150. As another example, a plurality of point light sources adjacent to each other may form a group, and the groups of the point light sources may be sequentially flickered. The point light sources included respectively in the groups may be sequentially flickered, one group at a time. In addition, a sensor for recognizing the location of the viewer may be further included such that the image may be displayed toward the location of one or more viewers.

The 3D image display apparatus 100, 200, or 300 may also display two-dimensional (2D) images, as well as 3D images. For example, when the point light sources 111-118 are simultaneously turned on and the display panel 150 modulates the incident light according to 2D image information, general 2D images may be displayed. That is, the 3D image display apparatus 100, 200, or 300 according to embodiments of the present invention may compatibly display 3D images and 2D images.

In addition, the 3D image display apparatus 100, 200, or 300 may be operated such that the images generated by the display panel 150 in the time-sequential manner may form a plurality of separate 2D images instead of a 3D image. That is, different kinds of images may be displayed according to the viewing directions, and thus, viewers located at different locations may see different images than one another.

As described herein, a 3D image display apparatus and method may generate multi-view 3D images that have no limitation in viewing point by using an active optical device array that may adjust the sequential flickering of the light sources and/or the incident direction of the light, without using an additional unit such as 3D glasses.

In addition, the light sources may be sequentially flickered selectively in consideration of the number of viewers and locations of the viewers, and power consumption may be reduced.

The methods, functions, operations, processes, and examples described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A three-dimensional (3D) image display apparatus comprising:
   a surface-light source device configured to emit light in a direction that is sequentially adjusted towards one or more visual fields, the surface-light source device comprising
      a light source unit comprising point light sources,
      a light guide plate comprising a first surface to which the light emitted from the light source unit is incident, and a second surface through which the incident light is emitted, and
      an inverted prism sheet configured to collimate the light emitted from the light guide plate;
   a display panel configured to generate images for each visual field by modulating the light emitted from the surface-light source device according to image information; and
   a controller configured to determine viewer locations corresponding to the visual fields and control the direction adjustment of the light emitted from the surface-light source device and the image generation for each visual field of the display panel to be synchronized with each other such that,
   in response to at least one first point light source among the point light sources being illuminated, an image is displayed only on a visual field corresponding to a first viewer location among the viewer locations, and
   in response to at least one second point light source among the point light sources being illuminated, an image is displayed only on another visual field corresponding to a second viewer location among the viewer locations.

2. The 3D image display apparatus of claim 1, wherein the light source unit comprises light source groups each of which comprises one or more adjacent point light sources among the point light sources, the adjacent point light sources in the light source groups are simultaneously flickered, and the light source groups are sequentially flickered one by one.

3. The 3D image display apparatus of claim 1, wherein the light source unit comprises light source groups each of which comprises adjacent point light sources among the point light sources, and the light source groups are simultaneously flickered such that one point light source in each respective group is flickered at the same time.

4. The 3D image display apparatus of claim 1, wherein the light guide plate is a wedge-type light guide plate and has a thickness that decreases in a direction away from the light source unit.

5. The 3D image display apparatus of claim 1, further comprising a sensor configured to recognize the viewer locations.

6. The 3D image display apparatus of claim 1, further comprising a passive optical device configured to converge the light emitted from the surface-light source device to a certain visual field.

7. The 3D image display apparatus of claim 6, wherein the passive optical device is located between the surface-light source device and the display panel.

8. The 3D image display apparatus of claim 6, wherein the display panel is located between the surface-light source device and the passive optical device.

9. A three-dimensional (3D) image display apparatus comprising:
   a surface-light source device configured to emit light beams that are collimated in a parallel direction, the surface-light source device comprising
      a light source unit comprising point light sources, a light guide plate comprising a first surface to which the light emitted from the light source unit is incident, and a second surface through which the incident light is emitted, and an inverted prism sheet configured to collimate the light emitted from the light guide plate;

a display panel configured to generate images by modulating light emitted from the surface-light source device according to image information;

an active optical device array unit configured to adjust the direction of the light such that an image generated by the display panel is displayed toward a visual field or another visual field; and a controller configured to determine viewer locations corresponding to the visual fields and control the image formation for each visual field of the display panel and the direction adjustment of the light by the active optical device array unit to be synchronized with each other such that, in response to at least one first point light source among the point light sources being illuminated, an image is displayed only on the visual field corresponding to a first viewer location among the viewer locations, and in response to at least one second point light source among the point light sources being illuminated, an image is displayed only on the other visual field corresponding to a second viewer location among the viewer locations.

10. The 3D image display apparatus of claim 9, further comprising a sensor configured to recognize a location of a viewer.

11. The 3D image display apparatus of claim 9, wherein the light source unit comprises light source groups each of which comprises one or more adjacent point light sources among the point light sources, the adjacent point light sources in the light source group are simultaneously flickered, and the light source groups are sequentially flickered one by one.

12. The 3D image display apparatus of claim 9, wherein the light source unit comprises light source groups each of which comprises adjacent point light sources among the point light sources, and the light source groups are simultaneously flickered such that one point light source in each respective group is flickered at the same time.

13. The 3D image display apparatus of claim 1, wherein the active optical device array unit is one of a variable lens array, a variable prism array, a computer generating hologram (CGH), and a variable grating array.

14. The 3D image display apparatus of claim 1, wherein the inverted prism sheet is disposed directly adjacent to the light guide plate and the display panel.

15. The 3D image display apparatus of claim 1, wherein a thickness of the light guide plate decreases in a direction away from the light source unit.

16. The 3D image display apparatus of claim 1, wherein the at least one first point light source comprises two or more point light sources and the at least one second point light source comprises two or more point light sources.

17. The 3D image display apparatus of claim 9, wherein the at least one first point light source comprises two or more point light sources and the at least one second point light source comprises two or more point light sources.

* * * * *